UNITED STATES PATENT OFFICE.

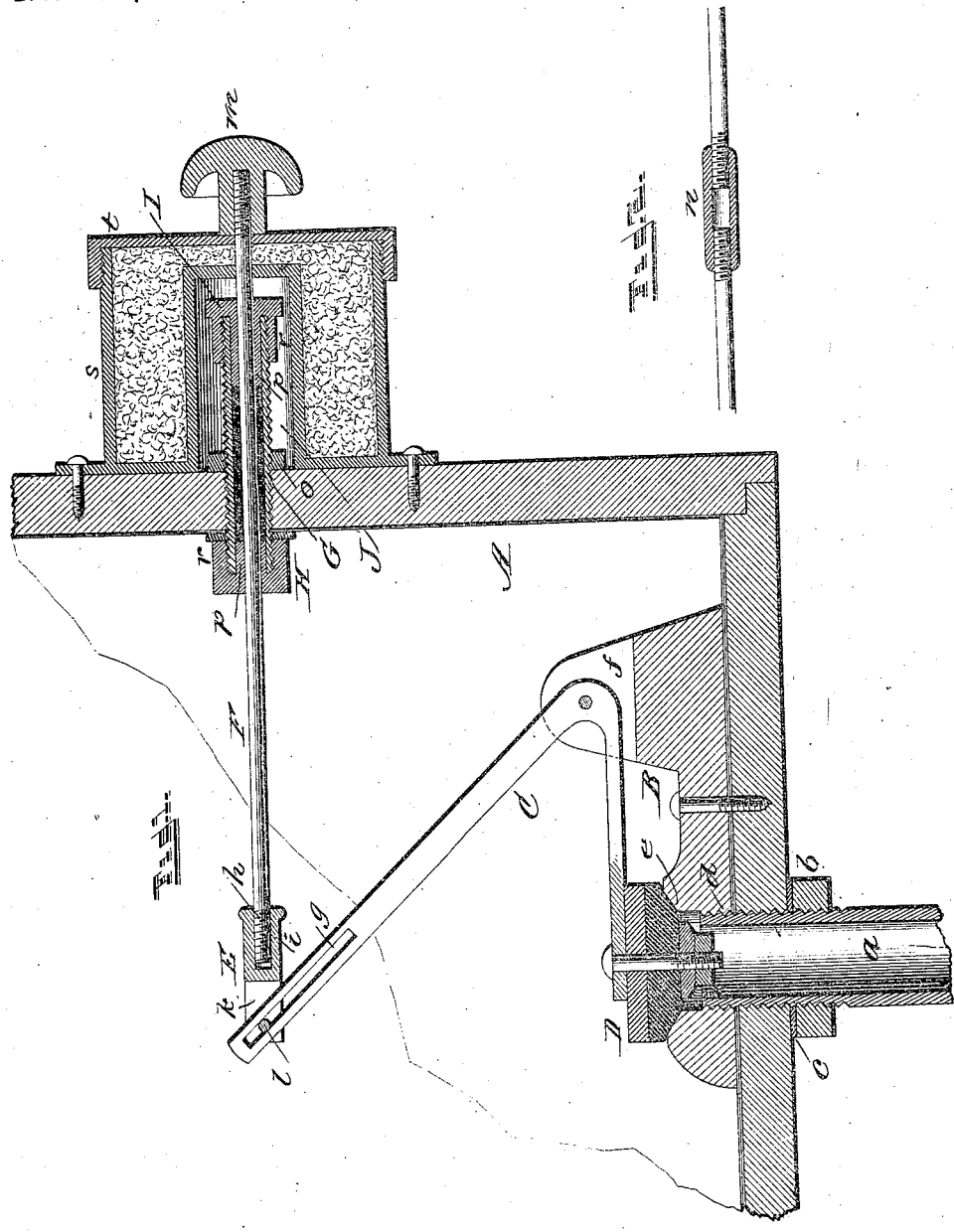

WILLIAM HENRY BARRETT, OF FORT WORTH, TEXAS.

ANTI-FREEZING TANK-VALVE.

SPECIFICATION forming part of Letters Patent No. 404,820, dated June 11, 1889.

Application filed January 21, 1889. Serial No. 296,955. (No model.)

*To all whom it may concern:*

Be it known that I, WILLIAM HENRY BARRETT, a citizen of the United States, residing at Fort Worth, in the county of Tarrant and State of Texas, have invented certain new and useful Improvements in Anti-Freezing Tank-Valves; and I do hereby declare that the following is a full, clear, and exact description of the same, reference being had to the annexed drawings, making a part of this specification, and to the letters and figures of reference marked thereon.

Figure 1 of the drawings is a part sectional elevation of my invention; and Fig. 2, a detail view, partly in section, showing a modification of the valve-rod.

The present invention has relation to that class of stationary tanks for holding water to provide a convenient means for watering stock and for other purposes where a stationary tank would be found useful; and the object of the invention is to provide a simple and anti-freezing valve mechanism for controlling the supply-pipe through which the water passes into the tank, which object I attain by the mechanism substantially as shown in the drawings, and hereinafter described and claimed.

In the accompanying drawings, A represents the tank, of any preferred construction and provided at its side or bottom with a pipe a, through which water is supplied to said tank. This pipe has a screw-threaded end, with which engages a nut b, located upon the outside of the walls of the tank, and has interposed between the wall and nut a washer c to form a tight joint and prevent any leak at the point of attachment of the pipe to the tank. The screw-threaded end of the pipe a extends up through the wall of the tank a sufficient distance to form means for connecting therewith a bracket B, which has a screw-threaded opening d to fit over the end of the pipe, and above this opening is the valve-seat e. This bracket is connected to the interior wall of the tank by means of screws or any well-known fastening that will hold it firmly in place, and has a slotted standard f, to which is pivoted a V-shaped lever C, one end of the lever having connected thereto a suitable valve D, and the other or longer arm of the lever is formed with a longitudinal slot g. To this slotted end of the lever C is connected a coupling F, which connects with the lever the valve-rod E, said rod having a screw-threaded end h, which engages with the screw-threads of a socket i in the coupling. The opposite end of the coupling is slotted, as shown at k, through which slotted end passes a pin l, and also through the slot g of the lever, thereby allowing free play of the lever when the valve-rod F is pulled out or in to open or close the valve.

By means of the screw-threaded coupling E and the screw-threaded end of the valve-rod said rod can be lengthened or shortened from its point of attachment with the coupling to the point of attachment with the knob m, thereby regulating the play of the lever C when the rod is pulled in or out to compensate for any wear on the valve or valve-seat.

In place of the screw-threaded coupling, as above described, the valve-rod may be made in sections with their inner ends screw-threaded, and a take-up nut used to couple the two ends of the rod together, as shown in Fig. 2, the nut n being of the common form ordinarily used for the purpose.

The valve-rod F passes through a stuffing-box G, which has exterior screw-threads to engage with a screw-threaded opening through the wall of the tank and held thereto by nut o and cap H, a washer being interposed between said cap and the inner wall of the tank. The cap H connects with the inner end of the stuffing-box G, and a similar cap I connects with the outer end of said box, and through these caps passes the valve-rod F. The caps H I have necks p, which enter the stuffing-box G tightly to securely hold in place the packing in the box, and the caps have exterior flanges r, with screw-threads upon their inner sides, with which engage the exterior screw-threads on the stuffing-box, thus providing a cap that will be perfectly water-tight and at the same time allow the rod to freely work through the stuffing-box and caps.

The frost-chamber J, which surrounds the stuffing-box, is provided with an annular space, in which is placed a non-freezing compound of any well-known material used for the purpose, the exterior wall of the chamber, as shown at s, having screw-threads for connecting thereto the cap t to hold the material in the space. The frost-chamber prevents the moisture or water that may possibly get on the rod from freezing, thereby insuring the operation of the rod at all times.

Having now fully described my invention, what I claim as new, and desire to secure by Letters Patent, is—

The combination, with the tank, its valve and lever, and the valve-rod F, of the frost-chamber having an annular space to receive the non-freezing compound, the stuffing-box G around the rod F and screw-threaded at the ends, and the screw-threaded caps H and I, having necks $p$ and flanges $r$, all arranged and operating substantially as shown and described.

In testimony that I claim the above I have hereunto subscribed my name in the presence of two witnesses.

WILLIAM HENRY BARRETT.

Witnesses:
 H. F. PRICE,
 F. H. LAWSON.